(No Model.)
J. PORTEOUS.
DRAFT CONNECTION FOR VEHICLES.
No. 578,581. Patented Mar. 9, 1897.
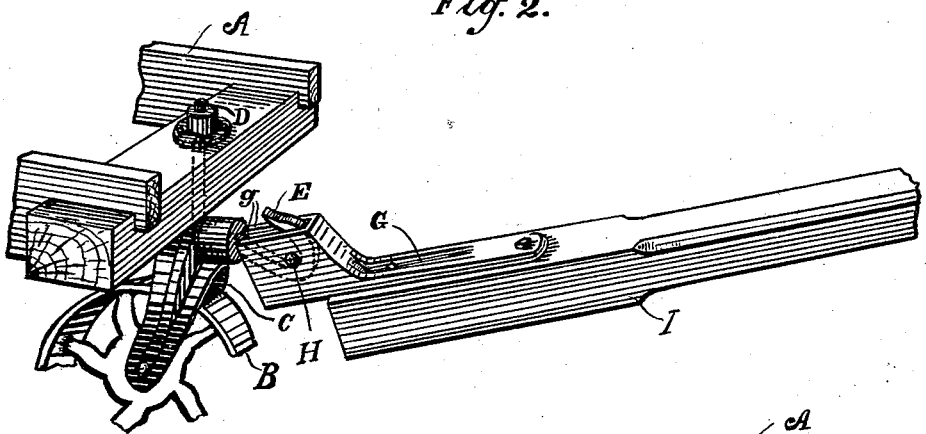
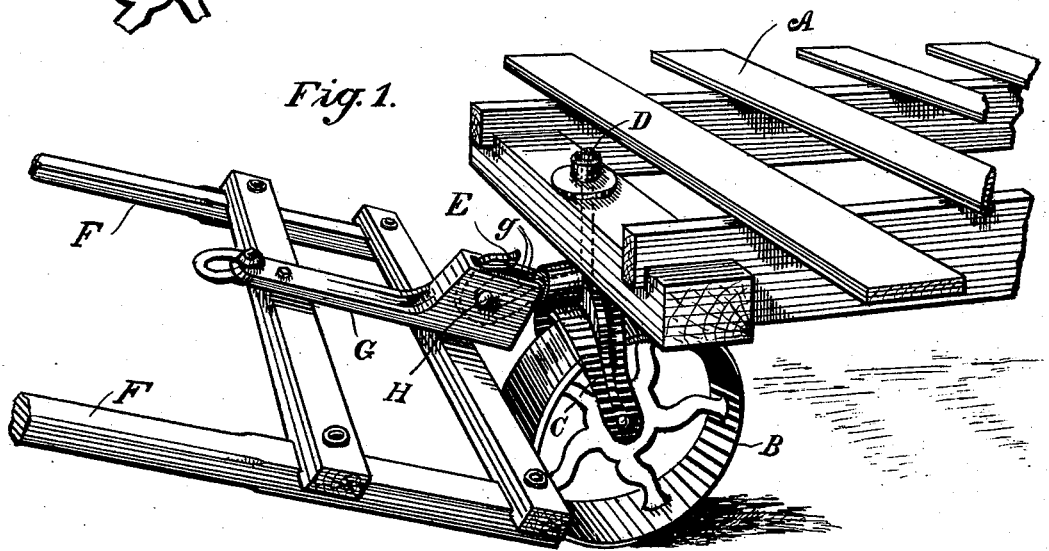
Witnesses,
Inventor,
James Porteous
By Dewey & Co.

UNITED STATES PATENT OFFICE.

JAMES PORTEOUS, OF FRESNO, CALIFORNIA.

DRAFT CONNECTION FOR VEHICLES.

SPECIFICATION forming part of Letters Patent No. 578,581, dated March 9, 1897.

Application filed June 15, 1896. Serial No. 595,670. (No model.)

*To all whom it may concern:*

Be it known that I, JAMES PORTEOUS, a citizen of the United States, residing at Fresno, county of Fresno, State of California, have invented an Improvement in Draft Connections for Vehicles; and I hereby declare the following to be a full, clear, and exact description of the same.

My invention relates to the class of connections by which the draft devices, such as poles and shafts, are attached to vehicles.

My invention is especially adapted for use with vehicles having a single pivotal front wheel, such, for example, as the three-wheeled trucks used in vineyards and orchards; and its object is to provide a simple and effective device for readily interchanging a pole or shafts in connection with such trucks and at the same time furnishing a bearing on each side with which to steady the connection and to more accurately guide the truck, both in traveling straight and in turning.

My invention consists in the novel construction and arrangement of the parts of the connection, which I shall now describe by reference to the accompanying drawings, in which—

Figure 1 is a perspective view of my draft connection, showing the shafts. Fig. 2 is a view of same, showing the pole.

A represents a wheeled vehicle, here shown as the common form of three-wheeled truck used in orchards and vineyards.

B is its front wheel, mounted, as usual, in a forked casting C, attached to the pivot-pin D. This pin has its lower extremity formed into a hook E.

F are shafts. To the cross-bars of these shafts is bolted the coupling-bar G. The rear end of this bar is formed with parallel separated jaw-plates *g*, between which fits the hook E, said hook being confined therein by a cross-pin H. The jaw-plates are quite wide, as shown, and they fit sufficiently close to each side of the hook to furnish side bearings therefor, thus steadying the coupling both in traveling straight and in turning, in which latter movement they bear against the hook and assist materially in the turn. The coupling is easily made and as readily broken by the simple insertion and removal of the cross-pin H.

The pole I (shown in Fig. 2) is also provided with a coupling-bar G, so that it is an easy matter to substitute pole for shafts, and vice versa, and in case it is not desirable to use either pole or shafts the hook is left ready for the attachment of double or single trees by a simple clevis, as is usually done in orchards and vineyards.

In the actual construction of the pivot-pin and its hook and the forked casting C the pin and hook are forged in one piece and then embedded in a mold, and then the forked casting is cast to the pin, so as to make the three parts, namely, the pin, the hook, and the forked casting, substantially a single structure.

Having thus described my invention, what I claim as new, and desire to secure by Letters Patent, is—

1. In vehicles having a swiveling wheel, the pivot-pin of said wheel having its lower portion bent substantially horizontal with its extremity formed with a hook for engagement with interchangeable coupling attachments.

2. A draft connection for a vehicle having a single, centrally-disposed pivotal front wheel, said connection consisting of the pivotal pin of the wheel-bearing, said pin having its lower extremity formed with a hook, a coupling-bar on the draft device, said bar having its rear extremity formed with wide parallel-spaced jaw-plates adapted to receive the hook between them and to furnish a bearing for said hook, and a cross-pin passing through the jaw-plates and engaging the hook.

In witness whereof I have hereunto set my hand.

JAMES PORTEOUS.

Witnesses:
S. H. NOURSE,
JESSIE C. BRODIE.